(12) United States Patent (10) Patent No.: US 8,867,368 B2
Pelekhaty et al. (45) Date of Patent: Oct. 21, 2014

(54) SYSTEMS AND METHODS FOR NOISE TOLERANT SIGNAL PROCESSING IN PILOT ASSISTED DATA RECEIVERS

(75) Inventors: Vladimir Pelekhaty, Baltimore, MD (US); Michael Y. Frankel, Baltimore, MD (US)

(73) Assignee: Ciena Corporation, Hanover, MD (US)

( * ) Notice: Subject to any disclaimer, the term of this patent is extended or adjusted under 35 U.S.C. 154(b) by 106 days.

(21) Appl. No.: 13/604,325

(22) Filed: Sep. 5, 2012

(65) Prior Publication Data

US 2014/0064102 A1 Mar. 6, 2014

(51) Int. Cl.
H04L 12/26 (2006.01)
(52) U.S. Cl.
USPC .......... 370/241; 370/208; 370/312; 370/491; 370/500; 370/252; 375/295; 375/296; 375/346
(58) Field of Classification Search
CPC ... H04L 43/50; H04L 12/3697; H04L 5/0048; H04L 5/0023; H04L 25/0226; H04L 27/2613; H04L 5/005; H04B 2201/709709
USPC ......... 370/241, 208, 312, 491, 500, 329, 252; 375/295, 296, 346
See application file for complete search history.

(56) References Cited

U.S. PATENT DOCUMENTS

| | | | | |
|---|---|---|---|---|
| 6,636,744 | B1 * | 10/2003 | Da | 455/456.1 |
| 8,432,891 | B2 * | 4/2013 | Li et al. | 370/350 |
| 2003/0153322 | A1 * | 8/2003 | Burke et al. | 455/450 |
| 2003/0174675 | A1 * | 9/2003 | Willenegger et al. | 370/335 |
| 2004/0184513 | A1 * | 9/2004 | Lundby et al. | 375/148 |
| 2005/0260958 | A1 * | 11/2005 | Haefner et al. | 455/161.1 |
| 2010/0232552 | A1 * | 9/2010 | Jung et al. | 375/344 |

OTHER PUBLICATIONS

R. S. Bondurant, D. Welford, S. B. Alexander, and V. W. S. Chan; "Frequency-noise cancellation in semiconductor lasers by nonlinear heterodyne detection"; Optics Letters, vol. 11, No. 12; Dec. 1986.
Kohichi Tamura, Stephen B. Alexander, Vincent W. S. Chan, and Don M. Boroson; "Phase-Noise Canceled Differential Phase-Shift-Keying (PNC-DPSK) for Coherent Optical Communication Systems"; Journal of Lightwave Technology, vol. 8, No. 2, Feb. 1990; (C) 1990 IEEE.
Wing C. Kwong, Paul R. Prucnal, and Malvin C. Teich; "Coherent Subcarrier Fiber-Optic Communication Systems with Phase-Noise Cancellation"; IEEE Transaction on Communications, vol. 41, No. 6, Jun. 1994.
"State of Polarization and Phase Noise Independent Coherent Optical Transmission System Based on Stokes Parameter Detection"; Electronic Letters—Nov. 10, 1988, vol. 24, No. 23.

(Continued)

*Primary Examiner* — Jamal Javaid
(74) *Attorney, Agent, or Firm* — Clements Bernard PLLC; Christopher L. Bernard; Lawrence A. Baratta, Jr.

(57) ABSTRACT

The present disclosure provides systems and methods for noise tolerant signal processing in a pilot assisted data receiver, including: given received pilots with common pilot components and individual pilot components, computing coefficients associated with the individual pilot components of the received pilots; and applying the computed coefficients to the received pilots to obtain conditioned pilots. The individual pilot components result from relatively slow changes of the received pilots relative to the common pilot components. The common pilot components result from relatively fast changes of the received pilots relative to the individual pilot components.

10 Claims, 7 Drawing Sheets

(56) References Cited

OTHER PUBLICATIONS

Silvello Betti, Franco Curti, Giancarlo De Marchis, and Eugenio Iannone; "Phase Noise and Polarization State Insensitive Optical Coherent Systems"; Journal of Lightwave Technology, vol. 8, No. 5, May 1990—(C) 1990 IEEE.

Tetsuya Miyazaki and Fumito Kubota; PSK Self-Homodyne Detection Using a Pilot Carrier for Multibit/symbol Transmission With Inverse-RZ Signal; IEEE Photonics Technology Letters, vol. 17, No. 6, Jun. 2005—(C) 2005 IEEE.

Tetsuya Miyazaki; "Linewidth-Tolerant QPSK Homodyne Transmission Using a Polarization-Multiplexed Pilot Carrier"; IEEE Photonics Technology Letters, vol. 18, No. 2, Jan. 15, 2006—(C) 2000 IEEE.

Martin Sjodin, Erik Agrell, Guo-Wei Lu, Pontus Johannisson, Magnus Karlsson, and Peter Andrekson; Interleaved Polarization Division Multiplexing in Self-Homodyne Coherent WDM Systems; ECOC 2010, Sep. 19-23, 2010, Torino, Italy (C)2010 IEEE.

Martin Sjodin, Erik Agrell, Pontus Johannisson, Guo-Wei Lu, Peter Andrekson, and Magnus Karlsson; "Filter Optimization for Self-Homodyne Coherent WDM Systems using Interleaved Polarization Division Multiplexing"; Chalmers Publication Library (C)2011 IEEE.

Lei Xu, Junqiang Hu, Dayou Qian, Ting Wang; "Coherent Optical OFDM Systems Using Optical Carrier Extraction"; (C) 2008 Optical Society of America.

S. Adhikari, S. L. Jansen, M. Alfiad, B. Inan, A. Lobato, V. A. J. M. Sleiffer, W. Rosenkranz; "Experimental Investigation of Self Coherent Optical OFDM Systems Using Fabry-Perot Filters for Carrier Extraction"; ECOC 2010, Sep. 1923, 2010, Torino, Italy (C) 2010 IEEE.

Brendon J. C. Schmidt, Zuraidah Zan, Liang B. Du, and Arthur J. Lowery; "120 Gbit/s Over 500-km Using Single-Band Polarization-Multiplexed Self-Coherent Optical OFDM"; Journal of Lightwave Technology, vol. 28, No. 4, Feb. 15, 2010 (C) IEEE.

S. L. Jansen, J. Morita, N. Takeda, H. Tamaka; "20-Gb/s OFDM Transmission over 4,160-km SSMF Enabled by RF-Pilot Tone Phase Noise Compensation"; (C) 2007 Optical Society of America.

S.L. Jansen, L. Morita, N. Takeda, H. Tanaka; "Pre-Emphasis and RF-Pilot Tone Phase Noise Compensation for Coherent OFDM Transmission Systems"; (C) 2007 IEEE.

Sebastian Randel, Susmita Adkikari, and Sander L. Jansen; "Analysis of RF-Pilot-Based Phase Noise Compensation for Coherent Optical OFDM Systems"; IEEE Photonics Technology Letters, vol. 22, No. 17, Sep. 1, 2010—(C) 2010 IEEE.

Martin Sjodin, Pontus Johannisson, Mats Skold, Magnus Karisson, Peter Andrekson; "Cancellation of SPM in Self-Homodyne Coherent Systems"; ECOC 2009, Sep. 20-24, 2009, Vienna, Austria. Paper 8.4.5.

Pontus Johannisson, Martin Sjodin, Magnus Karlsson, Ekawit Tipsuwannakul, and Peter Andrekson; Cancellation of Nonlinear Phase Distortion in Self-Homodyne Coherent Systems; IEEE Photonics Technology Letters, vol. 22, No. 11, Jun. 1, 2010.

B. Inan, S. Randel, S. L. Jansen, A. Lobato, S. Adhikari, N. Hanik; "Pilot-Toned-based Nonlinearity Compensation for Optical OFDM Systems"; ECOC 2010, Sep. 19-23, 2010, Torino, Italy.

Adriana Lobato, Beril Inan, Susmita Adhikari, Sander L. Jansen; "On the efficiency of RF-Pilot-based nonlinearity compensation for CO-OFDM"; OSA/OFC/NFOEC 2011; (C)2011 Optical Society of America.

Arthur James Lowery; "Amplified-spontaneous noise limit of optical OFDM lightwave systems"; (C) 2008 OSA; Jan. 21, 2008 / vol. 16, No. 2 / Optics Express 860.

Martin Sjodin, Pontus Johannisson, Magnus Karisson, Zhi Tong, and Peter A. Andrekson; "OSNR Requirements for Self-Homodyne Coherent Systems"; IEEE Photonics Technology Letters, vol. 22, No. 2, Jan. 15, 2010.

* cited by examiner

SYSTEMS AND METHODS FOR NOISE TOLERANT SIGNAL PROCESSING IN PILOT ASSISTED DATA RECEIVERS

FIELD OF THE DISCLOSURE

The present disclosure relates generally to systems and methods for use in communication networks, such as fiber optic communication networks, digital subscriber line (DSL) communication networks, wireless communication networks, and the like. More specifically, the present disclosure relates to systems and methods for noise tolerant signal processing in pilot assisted data receivers.

BACKGROUND OF THE DISCLOSURE

Fiber optic communication networks and the like are experiencing rapidly increasing capacity growth. This capacity growth is reflected in individual channel data rates inexorably scaling from 10 Gbps, to 40 Gbps, to 100 Gbps, to 1000 Gbps channels, and so on. The capacity growth is also reflected in increasing total channel counts carried within an optical fiber, for example.

The ever growing demand for increased bandwidth and channel capacity is being met by broadband polarization division multiplexed (PDM) coherent systems and the like utilizing multi lever amplitude/phase modulation formats, for example. In such systems, the essential tasks of pre-conditioning the signal at the transmitter and signal processing after coherent detection are carried out by extremely fast digital signal processing (DSP) integrated circuit (IC) chips. The tendency towards dramatic growth of the DSP chips' size, complexity, price, and power consumption and dissipation with ever increasing processing speeds is well researched and thoroughly documented.

A significant portion of the DSP algorithms and computing power is devoted to the solution of two crucial and computationally intense tasks: polarization de-multiplexing of received signals and laser frequency offset recovery and phase noise cancellation. The former involves the estimation, calculation, and application of the elements of the inverse Jones matrix of the optical fiber link for the recovery of the originally linearly polarized signals, while the later involves the determination of the fast spinning phasor generated by the beating of the signal carrier and local oscillator (LO) lasers and its utilization for phase locking of the coherently detected signals and rectifying them for the following steps of the data recovery processes. These computationally intense algorithms are accountable for the majority of the DSP chips' real estate and power usage.

As an alternative, pilot assisted techniques designed to perform the above tasks were conceived at the early onset of coherent fiber optic communication system design, long before the DSP era. The un-modulated, but either frequency shifted or orthogonally polarized, portion of the signal carrier laser light was launched into the optical fiber along with the information carrying signal and served as a built in phase noise reference at the receiver. Down mixing of the signal with the pilot at the receiver (i.e. multiplying the signal W by the complex conjugate pilot P*: W×P*) canceled their common noisy phase factors originating from the random phase walk due to finite linewidth of the signal carrier and LO lasers, as well as de-multiplexing the polarizations.

These pilot based signal processing techniques re-surfaced recently, allowing not only for much simpler ways of cancelling laser frequency offset and phase noise, but also for compensating the nonlinear phase distortion, greatly reducing or even eliminating the need for fast, expensive, and power hungry digital electronic signal processing.

However, all of the existing pilot assisted techniques suffer from one common drawback: the noise accompanying the pilot, mostly amplified spontaneous emission (ASE) noise generated in optical amplifiers, significantly compromises the pilot's ability to perform its functions, resulting in a pilot related signal quality (Q) penalty. Special measures are required to reduce or even eliminate the pilot noise related Q penalty.

BRIEF SUMMARY OF THE DISCLOSURE

The present disclosure provides special averaging (in the time domain) or filtering (in the frequency domain) methods to ensure virtually noiseless pilot operation, while performing polarization de-multiplexing and laser phase noise cancellation in polarization multiplexed coherent systems, as well as other systems, optionally employing wide linewidth distributed feedback (DFB) signal and LO lasers (in the case of optical links). The averaging/filtering methods of the present disclosure are applicable for analog signal processing (ASP) and DSP. It will be readily apparent to those of ordinary skill in the art that the averaging/filtering methods of the present disclosure are also applicable to electrical and wireless links.

Long time averaging and narrow frequency filtering are conventional methods for reducing signal corrupting noise. But these methods are not readily applicable to the pilots in pilot assisted coherent fiber optic communication systems, for example, due to the contraindications present in the requirements for pilot averaging and filtering. The tight filtering needed for noise reduction is in contradiction with the much broader spectral content of the pilots related to laser frequency offset and phase noise and, more importantly, the nonlinear phase noise, which requires hundreds of MHz of pilot bandwidth to be compensated.

The central concept of the present disclosure is based on the difference in the physical mechanisms affecting the pilots. One of them is determined by the co-propagation of the pilots together with the signal along the communication link all the way from the signal carrier laser to the intradyne coherent detector. Co-propagating pilots undergo the same polarization evolution as does the signal and hence attain all the information about the Jones matrix of the fiber link, resulting in different pilot components being proportional to the corresponding matrix elements (there are two per transmitted pilot, i.e. one for each of the Jones matrix elements). This mechanism is responsible for changes in the individual pilot components, which occur slowly, especially compared to the other much more dynamic phenomenon, such that they may be considered as quasi-static. The much faster dynamic mechanism involves the laser frequency offset and phase noise. These result in a fast spinning phasor factor generated by the beating of the signal carrier and LO lasers with the addition of a random phase walk from the laser phase noise. This phasor factor is common to all pilot components, and together with different individual components, they describe the pilots completely.

This phenomenological subdivision of the pilot into individual static and common dynamic components provides the avenue for accomplishing the desired averaging/filtering. This is done by averaging/filtering individual static pilot components separately from their common dynamic counterparts. This accomplishes the majority of the noise cleaning task. Additionally, the common dynamic part of the pilots has the noise related fluctuations of its amplitude averaged/filtered out, converting it to a constant amplitude phasor. The combination of these measures results in improved averaged/filtered pilots which accomplish the tasks of phase compensation and polarization de-multiplexing in spite of the presence of ASE generated noise underneath.

Thus, the systems and methods of the present disclosure resolve the contraindications in pilot based signal processing: the need for narrowband filtering to mitigate ASE noise penalties, and the need for wide spectral bandwidth to mitigate laser frequency, laser linewidth, and nonlinear impairments.

The systems and methods of the present disclosure provide the following benefits, among others:

1. the disclosed pilot averaging/filtering technique provides near complete elimination of performance deteriorating noise from pilots;
2. the disclosed pilot averaging/filtering technique restores the data channel Q factor values back to the level corresponding to noiseless pilots;
3. the disclosed pilot averaging/filtering technique preserves the benefits of pilot based processing in eliminating wideband laser phase noise;
4. the disclosed pilot averaging/filtering technique preserves the benefit of pilot based processing by substantially simplifying coherent receiver algorithms, and reducing associated electronic circuit size, cost, and power; and
5. the disclosed pilot averaging/filtering technique preserves the benefit of wideband pilot based processing in mitigating nonlinear optical fiber propagation impairments.

The uniqueness of the disclosed techniques is in their nontrivial implementation of pilot averaging/filtering, allowing for rigorous reduction of noise via averaging/filtering, while maintaining their broadband phase noise cancelling capabilities. This distinctive averaging/filtering of static pilot components and averaging/filtering of the dynamic phasors' magnitude are accomplished without the overburdening labor of separating them before and re-combining them after the averaging/filtering procedures.

In one exemplary embodiment, the present disclosure provides a method for noise tolerant signal processing in a pilot assisted data receiver, including: given received pilots with common pilot components and individual pilot components, computing coefficients associated with the individual pilot components of the received pilots; and applying the computed coefficients to the received pilots to obtain conditioned pilots. The individual pilot components result from relatively slow changes of the received pilots relative to the common pilot components. The common pilot components result from relatively fast changes of the received pilots relative to the individual pilot components. The method also includes removing noise from the individual pilot components by averaging/filtering the individual pilot components. The averaging/filtering the individual pilot components includes one of averaging the individual pilot components in a time domain and low pass filtering the individual components in a frequency domain. The method further includes preserving the common pilot components using wideband signal processing. The method still further includes down converting the received pilots to a baseband. Applying the computed coefficients to the received pilots to obtain the conditioned pilots includes deriving a linear combination of the pilot components with weights corresponding to the computed coefficients. The method still further includes converting the conditioned pilots to a constant amplitude phasor by removing associated noise related to amplitude fluctuations.

In another exemplary embodiment, the present disclosure provides a pilot assisted data receiver for noise tolerant signal processing, including: a processing block operable for, given received pilots with common pilot components and individual pilot components, computing coefficients associated with the individual pilot components of the received pilots; and a processing block operable for applying the computed coefficients to the received pilots to obtain conditioned pilots. The individual pilot components result from relatively slow changes of the received pilots relative to the common pilot components. The common pilot components result from relatively fast changes of the received pilots relative to the individual pilot components. The data receiver also includes a processing block operable for removing noise from the individual pilot components by averaging/filtering the individual pilot components. The averaging/filtering the individual pilot components includes one of averaging the individual pilot components in a time domain and low pass filtering the individual components in a frequency domain. The data receiver further includes a processing block operable for preserving the common pilot components using wideband signal processing. The data receiver still further includes a processing block operable for down converting the received pilots to a baseband. Applying the computed coefficients to the received pilots to obtain the conditioned pilots includes deriving a linear combination of the pilot components with weights corresponding to the computed coefficients. The data receiver still further includes a processing block operable for converting the conditioned pilots to a constant amplitude phasor by removing associated noise related to amplitude fluctuations.

In a further exemplary embodiment, the present disclosure provides a method for noise tolerant signal processing in a pilot assisted data receiver, including: down converting received pilots to a baseband; given received pilots with common pilot components and individual pilot components, computing coefficients associated with the individual pilot components of the received pilots; removing noise from the individual pilot components by averaging/filtering the individual pilot components; preserving the common pilot components using wideband signal processing; applying the computed coefficients to the received pilots to obtain conditioned pilots; and converting the conditioned pilots to a constant amplitude phasor by removing associated noise related to amplitude fluctuations. The averaging/filtering the individual pilot components includes one of averaging the individual pilot components in a time domain and low pass filtering the individual components in a frequency domain, and applying the computed coefficients to the received pilots to obtain the conditioned pilots includes deriving a linear combination of the pilot components with weights corresponding to the computed coefficients.

BRIEF DESCRIPTION OF THE DRAWINGS

The present disclosure is illustrated and described with reference to the various drawings, in which like reference numbers are used to denote like system components/method steps, as appropriate, and in which.

DETAILED DESCRIPTION OF THE DISCLOSURE

Figure 1:
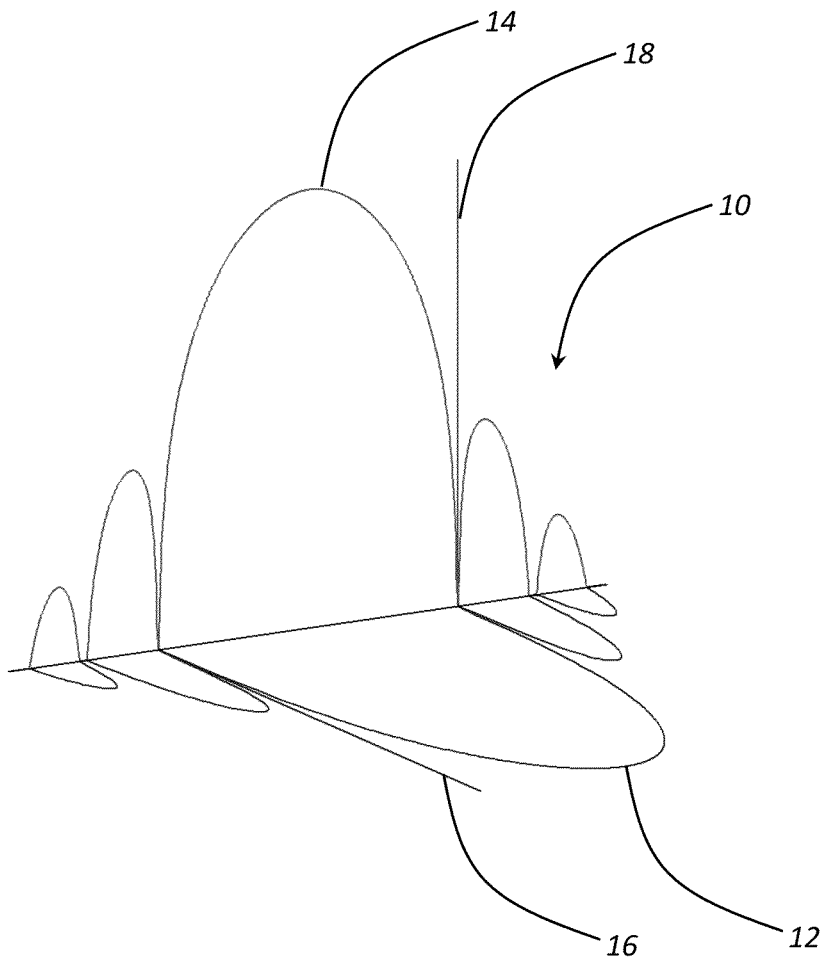
FIG. 1 is an optical spectra plot of a single carrier PDM QPSK signal, including horizontal and vertical polarizations with inserted horizontal and vertical pilot carriers at the nearest notch(es)

Conventional pilot assisted signal processing techniques were conceived more than two decades ago, during the early days of the development of coherent optical communication systems, long before the advent of erbium doped fiber amplifiers (EDFAs) and fast DSP. Optical carrier pilots were generated by either frequency shifting or flipping the polarization of a significant portion (usually half) of the total transmitted laser power, which could be either opposite phase modulated or frequency shifted.

By co-propagating along with the information loaded signal all the way through the fiber optic link, the carrier pilot serves as a built in phase reference to and polarization replica of the signal at the detection point. After self-coherent or coherent detection, pilot and signal are down mixed electronically by applying them to the mixer and low pass filtering (LPF). This procedure is mathematically equivalent to the multiplication of the signal W by complex conjugate pilot P*: W×P*, which completely cancels the common phase factors comprised of the frequency beatings and the phase noise of the signal and LO lasers. This cancellation greatly relaxes laser linewidth requirements, thus allowing the use of a multi-MHz broad linewidth DBF laser as a signal carrier and LO in a coherent fiber optic communication system, for example. The use of the inherent polarization transformation sensing properties of the carrier pilots allows the detection of the Stokes parameters of the fiber link and the unwrapping of the polarization of the signal by inverting the Jones matrix of the optical fiber.

Recently, the interest in pilot assistance was revived when pilot based self-homodyne phase shift keying (PSK), quadrature phase shift keying (QPSK), and coherent wavelength division multiplexing (WDM) polarization multiplexed systems were introduced. These use roughly half of the optical carrier's power as a polarization multiplexed pilot carrier. At the receiver, the pilot carrier is polarization de-multiplexed from the signal and realigned with it at the photodetector, serving as a co-propagating LO for homodyne coherent detection with all of the above mentioned benefits related to inherent laser phase noise immunity. Self-heterodyne detection has been used with optical frequency division multiplexing (OFDM) coherent systems, where a radio frequency (RF) synthesized pilot was located outside of the signal spectrum, instead of being polarization multiplexed, and was separated from the signal by tight optical filtering before mixing at the photodetector. Both self-homodyne and self-heterodyne systems eliminate the need for phase and polarization diversity of the receiver by analog down mixing of the co-polarized signal and the pilot carrier having intrinsically identical and mutually cancelling phase noise factors. This comes with the price of the necessity to share a significant portion (roughly half) of the total optical power between the signal and pilot, resulting in significant Q penalty, in spite of elaborate filtering, amplification, and optimization.

Modern coherent optical OFDM systems make further use of pilot assistance by utilizing much higher stability RF oscillators and frequency selectivity of the electrical filters as compared to their optical counterparts. Analog RF and microwave techniques are successfully implemented both for pilot synthesis and insertion at the transmitter and for filtering and down mixing with the signal at the receiver in the RF domain. This allows the allocation of a much smaller portion of the optical power for the pilot carrier, preserving the optical power budget of the signal. Compared to self-coherent systems, the use of a designated powerful LO laser for coherent detection at the receiver boosts coherent detection gain significantly.

Advanced electronic techniques not only refine the laser noise cancelling benefits of pilot assistance, but also contribute to the discovery of non-linear phase noise cancellation capabilities in self-homodyne and RF-pilot based coherent optical OFDM systems. Pilot assisted techniques have been reported to cancel self phase modulation (SPM) and compensate cross phase modulation (XPM) originated non-linear phase noise. The broadband spectral content of the non-linear phase noise component to be compensated requires significant, up to hundreds of MHz, pilot bandwidth for efficient non-linear phase noise compensation, unfortunately capturing significant ASE noise under the pilot, leading to sacrificed performance.

All of the above referenced benefits of pilot assisted fiber optic transmission, for example, have specific pilot related drawbacks. Self-homodyne and self-heterodyne systems are forced to split the optical power budget between the signal and pilot, sacrificing the signal power and optical signal-to-noise ratio (OSNR) performance. RF-pilot based coherent OFDM systems may have reduced pilot power requirements, but their performance also suffers from the detrimental effects of the ASE noise accumulated under the pilot spectrum, especially when broadband non-linear phase noise compensation techniques are utilized. The development and implementation of special averaging/filtering techniques allows for the reduction and even elimination of the detrimental effects of pilot noise.

Thus, modern intradyne coherent PDM fiber optic communication systems may benefit greatly from carrier pilot assistance in performing such tasks as laser frequency offset compensation, laser phase noise cancellation, non-linear phase noise compensation, and polarization de-multiplexing. Pilots make this processing much simpler, faster, and more efficient.

Figure 2:
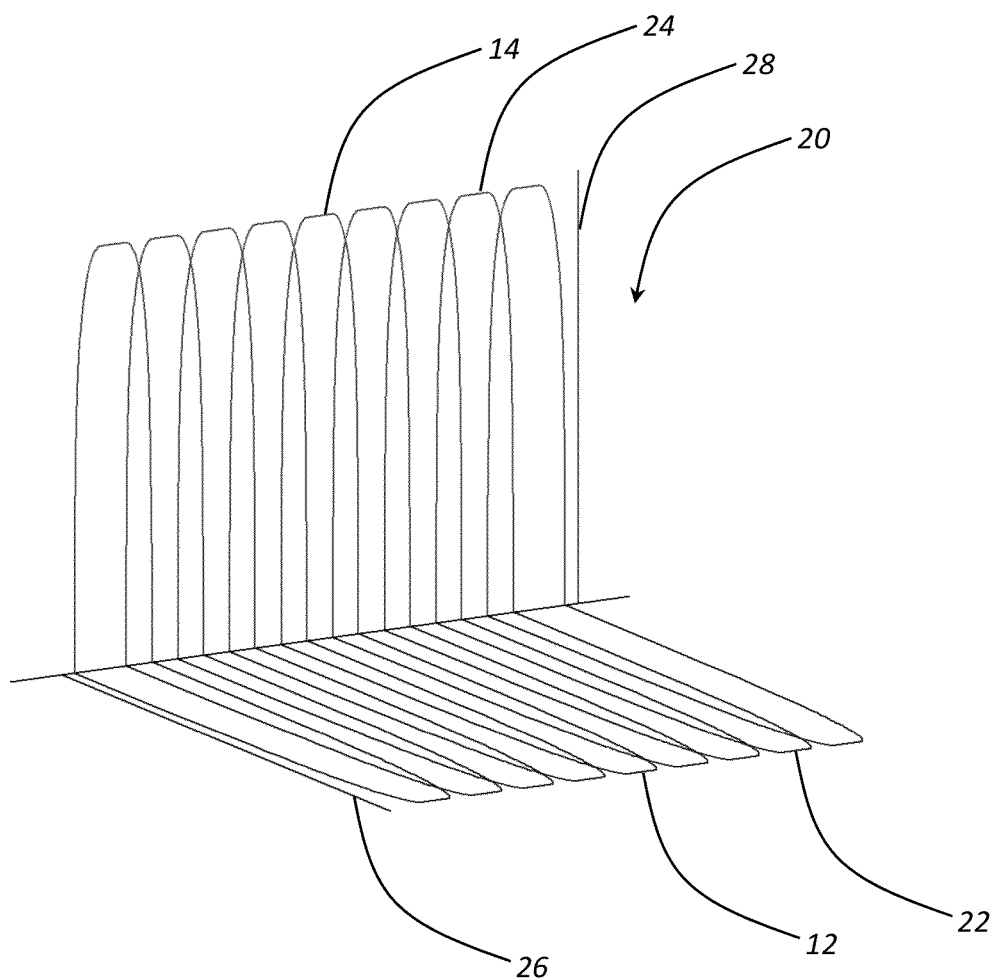
FIG. 2 is an optical spectra plot of a multiple carrier (e.g. nine subcarrier) OFDM QPSK signal, including horizontal and vertical polarizations with inserted horizontal and vertical pilot carriers just outside of the signal spectrum.

Referring specifically to FIG. 1, the optical spectra of a single carrier PDM QPSK signal 10 is illustrated, including horizontal 12 and vertical 14 polarizations with inserted horizontal 16 and vertical 18 pilot carriers at the nearest notch(es). Referring specifically to FIG. 2, the optical spectra of a multiple carrier (e.g. nine subcarrier) OFDM QPSK signal 20 is illustrated, including horizontal 12 and 22 and vertical 14 and 24 polarizations with inserted horizontal 26 and vertical 28 pilot carriers just outside of the signal spectrum. It should be noted that the signals 10 and 20 and subcarriers 12, 14, 22, and 24 are relatively broad because of the data being carried, while the pilots 16, 18, 26, and 28 are narrowband spikes on opposite sides of the spectra 10 and 20, such that they are separable.

Figure 3:
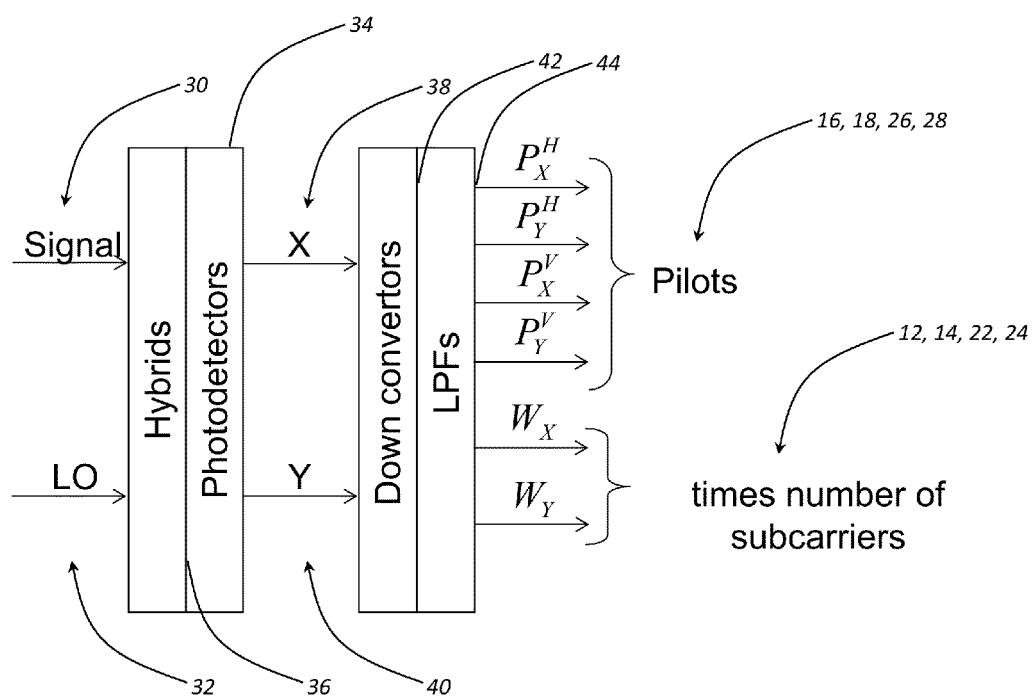
FIG. 3 is a schematic diagram illustrating one exemplary embodiment of the polarization and phase diverse intradyne coherent detection and RF baseband down conversion of pilots and signals in accordance with the systems and methods of the present invention.

Referring specifically to FIG. 3, while omitting the technical details of the generation and insertion of such pilots 16, 18, 26, and 28, via RF up conversion, optical signal side band modulation, and digital signal processing, for example, well known to those of ordinary skill in the art, the horizontally (H) 12 and 22 and vertically (V) 14 and 24 polarized PDM optical signals 10 and 20 (signal 30) are detected after propagation over a fiber optic link by polarization and phase diverse intradyne coherent photodetection 34 utilizing an LO 32 and hybrid 36, producing two complex electrical signals X 38 and Y 40, corresponding to two perpendicular polarizations of the LO laser. Standard RF mixing 42 and LPF filtering 44 techniques down convert the pilots 16, 18, 26, and 28 and information carrying signals 22 and 24 to the baseband for further processing. Baseband signals 12 and 14 are not down converted at this stage. All baseband pilots (P) and information carrying signals (W) are complex in phase and quadrature values, as a result of the RF down conversions. Subscripts indicate their appearance at two mutually orthogonal (X and Y) parts of the polarization diverse optical receiver, while superscripts indicate the pilots' origins at the horizontal (H) or vertical (V) polarizations of the transmitted optical signal. It is noted that two original pilots produce four outputs due to misalignment between the HV and XY principal polarization states.

The four pilots are comprised of their corresponding elements of the Jones matrix ($J_{11}$, $J_{12}$, $J_{21}$, and $J_{22}$) describing the fiber optic link and common phasor factor produced by laser frequency offset $\Delta\omega$ to and phase noise $\phi(t)$, with the omission of all irrelevant constants:

$$P_X^H \sim J_{11} e^{i(\Delta\omega t + \phi(t))};\ P_X^V \sim J_{12} e^{i(\Delta\omega t + \phi(t))};\ P_Y^H \sim J_{21} e^{i(\Delta\omega t + \phi(t))};\ P_Y^V \sim J_{22} e^{i(\Delta\omega t + \phi(t))} \quad (1)$$

Signal polarization de-multiplexing, laser frequency offset compensation, and laser phase noise cancellation are performed at the post-detection processing stage by combining the information carrying signals $W_X$ and $W_Y$ multiplied by the complex conjugate pilots, which now have inverse Jones matrix elements and phasors inverted with respect to those of the signals $W_X$ and $W_Y$:

$$W_X \times P_X^{H*} + W_Y \times P_Y^{H*} = I^H + jQ^H$$

$$W_X \times P_X^{V*} + W_Y \times P_Y^{V*} = I^V + jQ^V \quad (2)$$

As a result, the right-hand sides of the above two equations represent the recovered in-phase and quadrature tributaries of the transmitted QPSK data carrying horizontal (H) and vertical (V) signals ready for sampling and decision thresholding.

Figure 4:
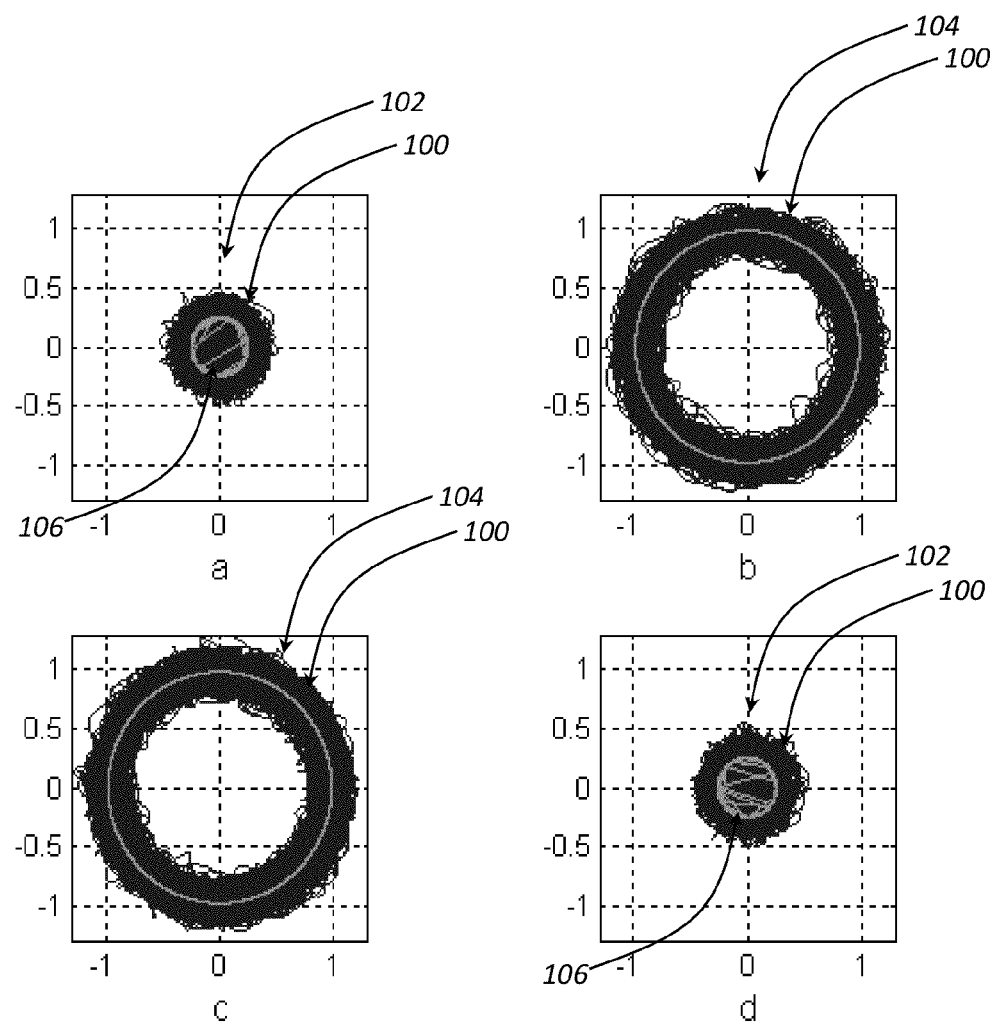
FIG. 4 is a series of plots illustrating noisy pilots' traces in the complex plane: (a)—$P_X^H$, (b)—$P_X^V$, (c)—$P_Y^H$, and (d)—$P_Y^V$, raw pilots and stabilized phasor amplitudes in accordance with Equation (3) below.

As already stated, the noise under the pilots has a detrimental effect on their ability to perform the post-detection processing. This is illustrated in FIG. 4, where raw noisy pilots 100 are plotted in the complex plane. The perfectly circular phasors of noiseless pilots are turned into shaggy rings by noise, with the annulus collapsing for smaller pilot amplitudes caused by diminishing Jones matrix elements, as in the cases of $P_X^H$ in (a) and $P_Y^V$ in (d) 102.

Balancing the need to eliminate the noise from under the pilots and to preserve the broadband phasor, a straightforward attempt at averaging/filtering may be performed by stabilizing the amplitude of the pilots, while leaving the phase intact. This may be done by replacing the pilots with their amplitude-stabilized versions:

$$<P_{X,Y}^{H,V}> = <|P_{X,Y}^{H,V}|> \times \frac{P_{X,Y}^{H,V}}{|P_{X,Y}^{H,V}|}, \quad (3)$$

where <o> designate averaging and |o| designate absolute value. The above formula expresses mathematically the transformation of shaggy annular pilots into constant radius circles with intact phase. This works well for strong pilots, such as in the cases of PIT in (b) and $P_Y^H$ in (c) 104, but for weaker pilots with collapsed annular rings 102, this causes undue fast phase jumps when pilots cross near the origin, as it is illustrated in the crisscrossing traces of (a) and (d) 106, thereby preventing successful signal recovery.

To avoid the problem of collapsing annular pilots, the above described amplitude stabilization procedure is preceded by a pre-conditioning averaging/filtering stage, thereby eliminating the possibility of annular pilot traces collapsing.

This pre-conditioning averaging/filtering stage is based on the fact that the pilots are comprised of a common fast spinning dynamic phase factor produced by the laser frequency offset $\Delta\omega$ to and phase noise $\phi(t)$ and the individual "quasi-static" slowly changing (in time) parts related to the polarization evolution and described by the Jones matrix elements. These are designated as "static" (S) and "dynamic" (D):

$$P_X^H = D \times S_X^H;\ P_X^V = D \times S_X^V;\ P_Y^H = D \times S_Y^H;\ P_Y^V = D \times S_Y^V \quad (4)$$

By multiplying the pilots by their own complex conjugate static parts and realizing that the root mean square of the pilot absolute values gives the absolute value of their static parts:

$$P_X^H \times S_X^{H*} = D \times |S_X^H|^2 = D \times <|P_X^H|^2>$$

$$P_X^V \times S_X^{V*} = D \times |S_X^V|^2 = D \times <|P_X^V|^2>$$

$$P_Y^H \times S_Y^{H*} = D \times |S_Y^H|^2 = D \times <|P_Y^H|^2>$$

$$P_Y^V \times S_Y^{V*} = D \times |S_Y^V|^2 = D \times <|P_Y^V|^2> \quad (5)$$

From this, the expression for the common dynamic part of the pilots is derived:

$$D = \frac{P_X^H \times S_X^{H*} + P_Y^H \times S_Y^{H*} + P_X^V \times S_X^{V*} + P_Y^V \times S_Y^{V*}}{<|P_X^H|^2 + |P_Y^H|^2 + |P_X^V|^2 + |P_Y^V|^2>} \quad (6)$$

The pre-conditioned complex conjugate pilots used in Equation (2) for polarization de-multiplexing, laser frequency offset compensation, and laser phase noise cancellation may be expressed by substituting Equation (6) into Equation (4):

$$<P_X^{H*}> = |S_X^H|^2 P_X^{H*} + S_X^{H*} S_X^V P_X^{V*} + S_X^{H*} S_Y^H P_Y^{H*} + S_X^{H*} S_Y^V P_Y^{V*}$$

$$<P_X^{V*}> = S_X^{V*} S_X^H P_X^{H*} + |S_X^V|^2 P_X^{V*} + S_X^{V*} S_Y^H P_Y^{H*} + S_X^{V*} S_Y^V P_Y^{V*}$$

$$<P_Y^{H*}> = S_Y^{H*} S_X^H P_X^{H*} + S_Y^{H*} S_X^V P_X^{V*} + |S_Y^H|^2 P_Y^{H*} + S_Y^{H*} S_Y^V P_Y^{V*}$$

$$<P_Y^{V*}> = S_Y^{V*} S_X^H P_X^{H*} + S_Y^{V*} S_X^V P_X^{V*} + S_Y^{V*} S_Y^H P_Y^{H*} + |S_Y^V|^2 P_Y^{V*} \quad (7)$$

The constant common denominator of the expression of Equation (6) for D is omitted for simplicity, keeping in mind that it may always be absorbed by the static parts of the pilots being normalized by it. This denominator represents the total optical power of the pilots, and is constant if the input signal power in the receiver is kept constant.

A 4-by-4 matrix S of constant coefficients involved in the calculation of the pre-conditioned pilots from the raw ones consists of the cross products of the still unknown static parts of the pilots and their complex conjugates:

$$S = \begin{pmatrix} |S_X^H|^2 & S_X^{H*}S_X^V & S_X^{H*}S_Y^H & S_X^{H*}S_Y^V \\ S_X^{V*}S_X^H & |S_X^V|^2 & S_X^{V*}S_Y^H & S_X^{V*}S_Y^V \\ S_Y^{H*}S_X^H & S_Y^{H*}S_X^V & |S_Y^H|^2 & S_Y^{H*}S_Y^V \\ S_Y^{V*}S_X^H & S_Y^{V*}S_X^V & S_Y^{V*}S_Y^H & |S_Y^V|^2 \end{pmatrix} \quad (8)$$

Figure 5:
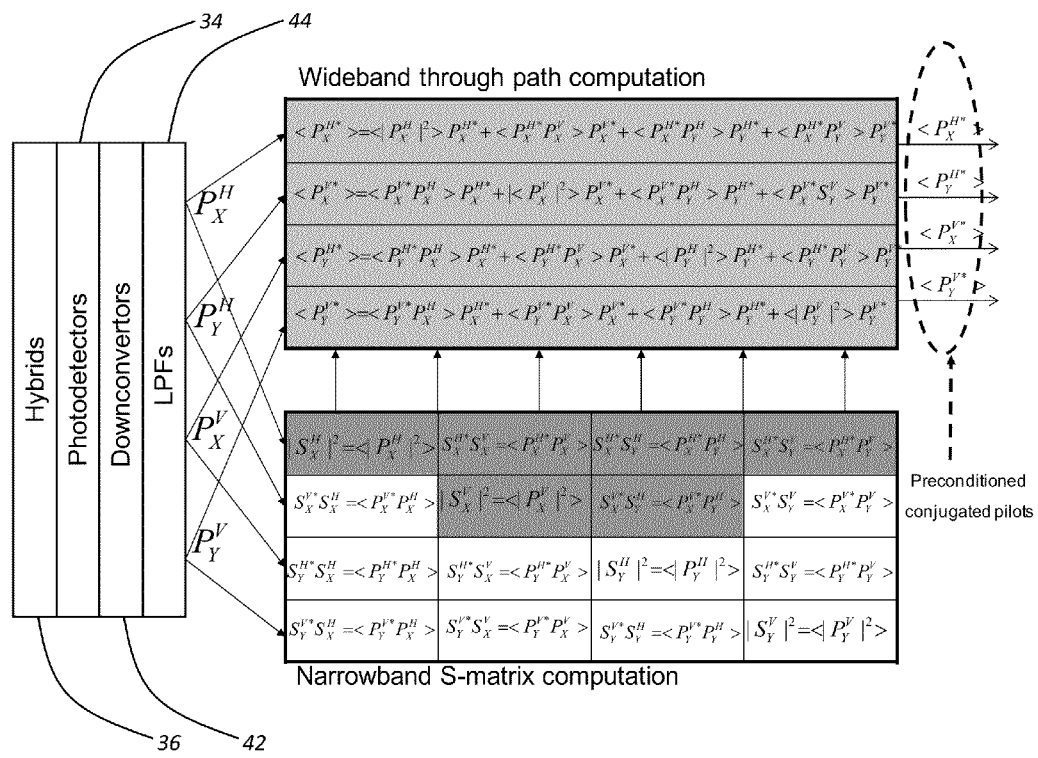
FIG. 5 is a schematic diagram illustrating one exemplary embodiment of the computations performed to generate conditioned and conjugated pilots in accordance with the systems and methods of the present invention.

The process of computing both the S matrix of Equation (9) below and the pre-conditioned pilots of Equation (10) below is illustrated in FIG. 5 and explained as follows. Similar to the equality of the root mean square of the pilot absolute value to the absolute value of its static part used in Equation (5), the cross products of the still unknown static parts of the pilots and their complex conjugates in the matrix S may be replaced by the averaged cross products of the pilots and their complex conjugates. This is due to the fact that D is a common phase factor for all components, and drops out after conjugate multiplication. These are readily computable, thus eliminating the need to find the static parts of the pilots themselves:

$$S = \begin{pmatrix} <|P_X^H|^2> & <P_X^{H*}P_X^V> & <P_X^{H*}P_Y^H> & <P_X^{H*}P_Y^V> \\ <P_X^{V*}P_X^H> & <|P_X^V|^2> & <P_X^{V*}P_Y^H> & <P_X^{V*}P_Y^V> \\ <P_Y^{H*}P_X^H> & <P_Y^{H*}P_X^V> & <|P_Y^H|^2> & <P_Y^{H*}P_Y^V> \\ <P_Y^{V*}P_X^H> & <P_Y^{V*}P_X^V> & <P_Y^{V*}P_Y^H> & <|P_Y^V|^2> \end{pmatrix} \quad (9)$$

Using this version of the S matrix, the pre-conditioned pilots may be expressed in terms of averaged cross products of the pilots and their complex conjugates (instead of their unknown static parts):

$<P_X^{H*}> = <|P_X^H|^2>P_X^{H*} + <P_X^{H*}P_X^V>P_X^{V*} + <P_X^{H*}P_Y^H>P_Y^{H*} + <P_X^{H*}P_Y^V>P_Y^{V*}$ $<P_X^{V*}> = <P_X^{V*}P_X^H>P_X^{H*} + <|P_X^V|^2>P_X^{V*} + <P_X^{V*}P_Y^H>P_Y^{H*} + <P_X^{V*}S_Y^V>P_Y^{V*}$ $<P_Y^{H*}> = <P_Y^{H*}P_X^H>P_X^{H*} + <P_Y^{H*}P_X^V>P_X^{V*} + <|P_Y^H|^2>P_Y^{H*} + <P_Y^{H*}P_Y^V>P_Y^{V*}$ $<P_Y^{V*}> = <P_Y^{V*}P_X^H>P_X^{H*} + <P_Y^{V*}P_X^V>P_X^{V*} + <P_Y^{V*}P_Y^H>P_Y^{H*} + <|P_Y^V|^2>P_Y^{V*}$

Further simplification of the above expression for the pre-conditioned pilots may be achieved based on the properties of the elements of the unitary Jones matrix. This step is not required, but may be used to achieve further processing simplification in cases where the optical fiber polarization dependent loss (PDL) and Polarization mode dispersion (PMD) are small, for example.

Since $S_X^H \sim J_{11} = u$;

$S_X^V \sim J_{12} = v$;

$S_Y^H \sim J_{21} = -v^*$;

$S_Y^V \sim J_{22} = u^*$, then $S_X^H = S_Y^{V*}$ and $S_X^V = -S_Y^{H*}$, and following the symmetry among the elements of the S matrix:

$S_{11} = S_{44}, S_{22}$ $= S_{33}, S_{23}$ $= S_{32}^*, S_{14}$ $= S_{41}^*, S_{12}$ $= S_{21}^*$ $= -S_{34}$ $= -S_{43}^*, S_{13}$ $= S_{31}^*$ $= -S_{24}$ $= -S_{42}^*$

This leaves only two real (for example, $S_{11}$ and $S_{22}$) and four complex (for example, $S_{12}$, $S_{13}$, $S_{14}$, and $S_{23}$) independent constant coefficients out of the 16 original S matrix elements to be calculated and this may be used for pre-conditioning of the pilots:

$P_X^{H*} > = S_{11}P_X^{H*} + S_{12}P_X^{V*} + S_{13}P_Y^{H*} + S_{14}P_Y^{V*}$ $P_X^{V*} > = S_{12}^*P_X^{H*} + S_{22}P_X^{V*} + S_{23}P_Y^{H*} - S_{13}P_Y^{V*}$ $P_Y^{H*} > = S_{13}^*P_X^{H*} + S_{23}^*P_X^{V*} + S_{22}P_Y^{H*} - S_{12}P_Y^{V*}$ $P_Y^{V*} > = S_{14}^*P_X^{H*} - S_{13}P_X^{V*} - S_{12}^*P_Y^{V*} - S_{11}^*P_Y^{V*}$ (11)

Figure 6:
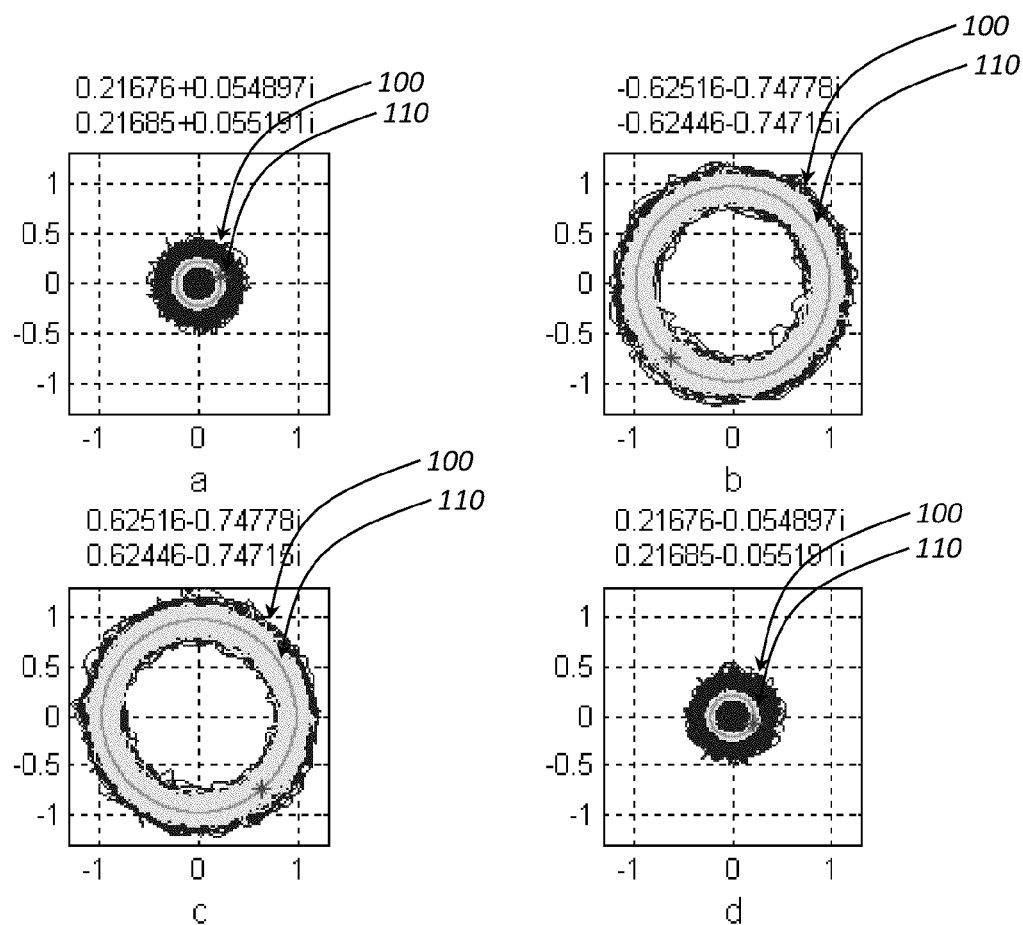
FIG. 6 is a series of plots illustrating averaged/filtered and noisy pilot traces in the complex plane: (a)—$P_X^H$, (b)—$P_X^V$, (c)—$P_Y^H$, and (d)—$P_Y^V$, raw pilots, static parts of the pilots averaged/filtered by pre-conditioning, additionally stabilized phasor amplitudes in accordance with Equation (3) below, +—a priori known ideal static parts of the pilots as used in simulations (top line of the titles), and ×—extracted from raw pilot data static parts of the pilots (bottom line of the titles)

The pre-conditioned pilots $<P_{X,Y}^{H,V*}>$ obtained from the above Equations (7), (10), and (11) have their static parts averaged/filtered, while the common dynamic parts are still intact. This is why the pre-conditioned pilot traces form non-collapsing annular rings with similar aspect ratios in the complex plane 110, which are illustrated in FIG. 6, along with the raw pilot traces 100. Pre-conditioning is performed by averaging over 10 microseconds or, equivalently, by filtering within 100 kHz, for example, accommodating for the fastest of the polarization evolution dynamics.

The pre-conditioning of the pilots guarantees that their annular traces do not collapse and, hence, renders the application of the amplitude stabilization of the common dynamic phasor amplitude in accordance with Equation (3) safe and justified:

$$<<P_{X,Y}^{H,V*}>> = <|<P_{X,Y}^{H,V*}>|> \times \frac{<P_{X,Y}^{H,V*}>}{|<P_{X,Y}^{H,V*}>|}, \quad (12)$$

The result of this final step of the pilot processing produces amplitude-stabilized circular pilot phasors $<P_{X,Y}^{H,V*}>$ 110, as illustrated.

The pilot traces of FIG. 6 are normalized to eliminate irrelevant constants and reduced down to their corresponding Jones matrix elements for clarity. This allows for the illustration of the accuracy of the procedures of the present disclosure by comparing the a priori known Jones matrix elements (the top line of the plot titles and + on the plots) with ones extracted from the raw pilots (the bottom line of the plot titles and x on the plots). The difference is very small (i.e. the standard deviation between them is 0.001), resulting in perfect posteriori extraction of the Jones matrix elements—crucial for correct polarization de-multiplexing and elimination of polarization crosstalk.

The ultimate test of the noise tolerance of the proposed pilot averaging/filtering technique is the reduction of the ASE inflicted Q penalty with respect to the case of the raw pilots. Such cases were simulated for the pilot assisted optical PDM OFDM offset QPSK signals illustrated in FIG. 2. Baud rate was 4 Gb/s and the pilot LPF had 400 MHz bandwidth. Simulated Q in dB is plotted in FIG. 7 when computed using differently conditioned pilots: corresponding to the raw pilots (Q=12 dB) 50, pre-conditioned static parts of the pilots (Q=13.7 dB) 52, additionally stabilized phasor amplitudes of the pre-conditioned pilots (Q=14.1 dB) 54, and artificially noiseless pilots (no ASE noise added under the pilots, purely for benchmarking purposes) 56.

These simulations were performed with signal-to-LO laser frequency offset randomly chosen between −50 MHz and +50 MHz, both lasers with 1 MHz linewidth, and random fiber Jones matrix elements.

Figure 7:
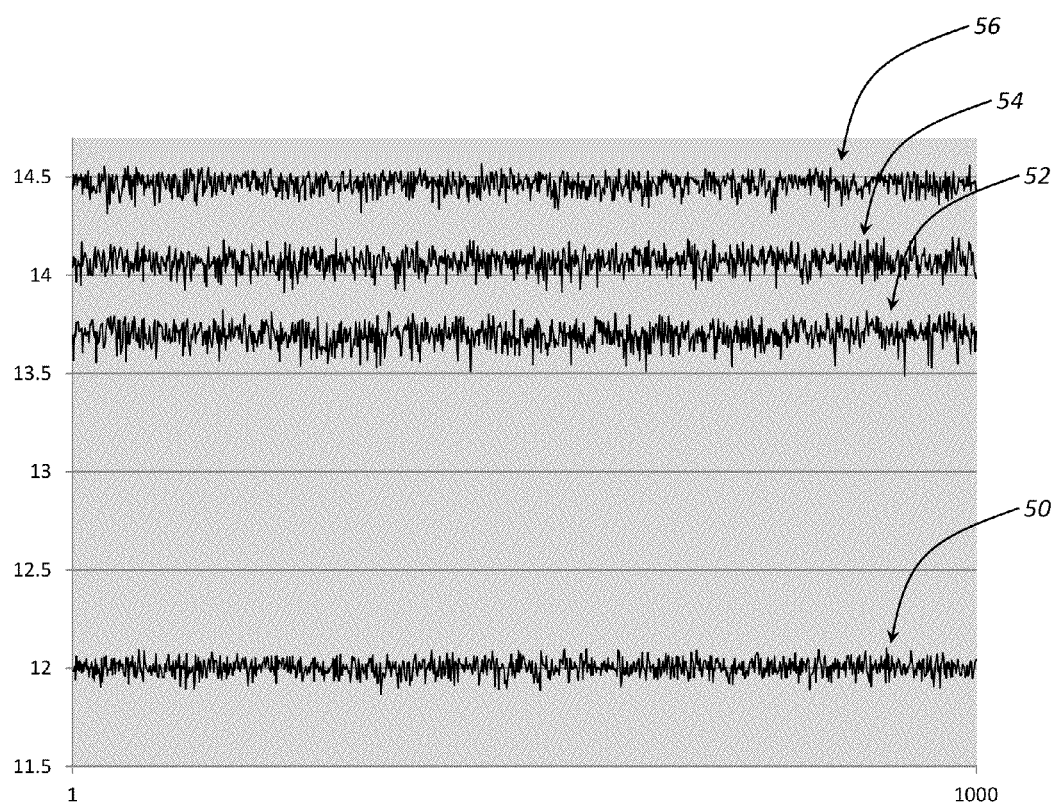
FIG. 7 is a plot illustrating the Q factor (in dB) when computed using the raw pilots, the pre-conditioned pilots, the rectified phasors, and noiseless pilots.

It is evident from FIG. 7 that pre-conditioning the static parts of the pilots increases Q by 1.7 dB. Additional stabilization of the pilot phasor amplitudes raises the Q increment to 2.1 dB, just less than 0.4 dB short of the ultimate limit obtainable with noiseless pilots. Even with a moderate pilot averaging time of 0.25 microsecond (equivalent to filtering within 4 MHz) the standard deviation of the estimated Jones matrix elements from their a priori known values from simulations is only 0.006, resulting in good polarization de-multiplexing of the received signals and negligible polarization crosstalk. Almost all of the pilot related ASE Q penalty was recovered as a result of application of the pilot averaging/filtering procedures. Small fractions of the dB shortage of the ultimate limit corresponding to the noiseless pilots may be explained by ASE contributing the azymuthal component of the pilot, thus generating additional phase noise in the phasor indistinguishable from the laser phase noise and hence practically unfixable.

Thus, the present disclosure resolves a critical contradiction in pilot based signal processing: the need for narrowband filtering to mitigate ASE noise penalties, and the need for significant spectral bandwidth to mitigate laser frequency, laser linewidth, and nonlinear impairments. The uniqueness of the disclosed techniques is in the non-trivial implementation of pilot averaging/filtering techniques, allowing for a rigorous reduction in noise via averaging/filtering, while maintaining broadband phase noise cancelling capabilities. The distinctive averaging/filtering of the static pilot components and averaging/filtering of the dynamic phasor magnitude are accomplished without the need for the overburdening labor of separating them before and re-combining them after the averaging/filtering procedures.

The present disclosure is directly applicable to the coherent signal processing of optical signals, regardless of the specific implementation or modulation format, and finds specific applicability with modulation formats with denser constellations, i.e. ones requiring the elimination of phase noise, as well as nonlinear impairments. Transport and switching platforms benefit from improved performance, and substantial hardware density increases afforded by much lower signal processing power consumption. The same approach is applicable in the wireless industry, which uses OFDM-type communication links.

Although the present disclosure has been illustrated and described with reference to preferred embodiments and specific examples thereof, it will be readily apparent to those of ordinary skill in the art that other embodiments and examples may perform like functions and/or achieve like results. All such equivalent embodiments and examples are within the spirit and scope of the present disclosure, are contemplated thereby, and are intended to be covered by the following claims.

What is claimed is:

1. A method for noise tolerant signal processing in a pilot assisted data receiver, comprising:

given received pilots with common pilot components and individual pilot components that collectively describe the received pilots completely and are averaged/filtered separately, computing coefficients associated with the individual pilot components of the received pilots;

applying the computed coefficients to the received pilots to obtain conditioned pilots, wherein applying the computed coefficients to the received pilots to obtain the conditioned pilots comprises deriving a linear combination of the individual pilot components with weights corresponding to the computed coefficients; and converting the conditioned pilots to a constant amplitude phasor by removing associated noise related to amplitude fluctuations, wherein the common pilot components comprise a dynamic phase factor produced by a frequency offset and a phase noise and the individual pilot components comprise a quasi-static portion related to a polarization evolution.

2. The method of claim 1, further comprising removing noise from the individual pilot components by averaging/filtering the individual pilot components.

3. The method of claim 2, wherein the averaging/filtering the individual pilot components comprises one of averaging the individual pilot components in a time domain and low pass filtering the individual components in a frequency domain.

4. The method of claim 1, further comprising preserving the common pilot components using wideband signal processing.

5. The method of claim 1, further comprising down converting the received pilots to a baseband.

6. A pilot assisted data receiver for noise tolerant signal processing, comprising:

a processing circuit operable for: given received pilots with common pilot components and individual pilot components that collectively describe the received pilots completely and are averaged/filtered separately, computing coefficients associated with the individual pilot components of the received pilots;

applying the computed coefficients to the received pilots to obtain conditioned pilots, wherein applying the computed coefficients to the received pilots to obtain the conditioned pilots comprises deriving a linear combination of the individual pilot components with weights corresponding to the computed coefficients; and converting the conditioned pilots to a constant amplitude phasor by removing associated noise related to amplitude fluctuations, wherein the common pilot components comprise a dynamic phase factor produced by a frequency offset and a phase noise and the individual pilot components comprise a quasi-static portion related to a polarization evolution.

7. The data receiver of claim 6, wherein the processing circuit is further operable for removing noise from the individual pilot components by averaging/filtering the individual pilot components.

8. The data receiver of claim 7, wherein the averaging/filtering the individual pilot components comprises one of averaging the individual pilot components in a time domain and low pass filtering the individual components in a frequency domain.

9. The data receiver of claim 6, wherein the processing circuit is further operable for preserving the common pilot components using wideband signal processing.

10. The data receiver of claim 6, wherein the processing circuit is further operable for down converting the received pilots to a baseband.

* * * * *